(12) United States Patent
Gill

(10) Patent No.: US 6,943,996 B2
(45) Date of Patent: Sep. 13, 2005

(54) MAGNETIC BIASING LAYER FOR GMR SENSOR OF A MAGNETIC HEAD FOR A HARD DISK DRIVE

(75) Inventor: Hardayal Singh Gill, Palo Alto, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 155 days.

(21) Appl. No.: 10/631,333

(22) Filed: Jul. 30, 2003

(65) Prior Publication Data

US 2005/0024794 A1 Feb. 3, 2005

(51) Int. Cl.[7] ............................................. G11B 5/39
(52) U.S. Cl. ..................................................... 360/324.12
(58) Field of Search ................ 360/324.12, 324, 360/313, 110

(56) References Cited

U.S. PATENT DOCUMENTS

2003/0090844 A1 * 5/2003 Shimizu et al. ........ 360/324.12
2004/0252419 A1 * 12/2004 Takano .................. 360/324.12

FOREIGN PATENT DOCUMENTS

JP         2004-6493 A  *  1/2004
JP         2004-14705 A *  1/2004

* cited by examiner

*Primary Examiner*—Julie Anne Watko
(74) *Attorney, Agent, or Firm*—Robert O. Guillot; Intellectual Property Law Offices

(57) ABSTRACT

A GMR sensor of a magnetic head for a hard disk drive including a free magnetic layer that is disposed between two hard bias layers that creates a bias magnetic field within the free magnetic layer. A bias reduction layer is disposed parallel to the free magnetic layer, and a spacer layer is disposed parallel to and between the free magnetic layer and the bias reduction layer. A negative magnetic coupling between the free magnetic layer and the bias reduction layer induces a bias reduction magnetic field in the free magnetic layer. The bias reduction field substantially counteracts the bias field in the central portion of the free magnetic layer, and the sensitivity of the free magnetic layer to small magnetic fields from the magnetic disk is significantly increased. A hard disk drive with decreased track width and increased areal density using this magnetic head is also disclosed.

20 Claims, 2 Drawing Sheets

MAGNETIC BIASING LAYER FOR GMR SENSOR OF A MAGNETIC HEAD FOR A HARD DISK DRIVE

FIELD OF THE INVENTION

The invention relates generally to magnetic heads for hard disk drives, and more particularly to a giant magnetoresistive (GMR) sensor having a free magnetic layer with an additional magnetic biasing layer.

BACKGROUND

An important goal of the hard disk drive industry is to develop magnetic heads for hard disk drives that provide ever faster data writing speeds, and that allow data to be written with ever increasing areal data storage density, that is, with more bits of data written per unit of disk area.

As is known to those skilled in the art, prior art magnetic head designs include a GMR sensor having a plurality of thin film layers that include a free magnetic layer that is disposed between two hard bias layers. The hard bias layers have relatively high magnetic coercivity and act as a hard magnet to provide a magnetic field that biases the free magnetic layer. Under the influence of this bias magnetic field, the magnetic fields of the free magnetic layer are generally stable and oriented in a single direction.

As the magnetic head passes over various data bit positions along a data track on the disk, the magnetic field of the free magnetic layer rotates in response to the magnetic fields of the data bits of the hard disk. Therefore, to function properly, the magnetic field of the data bits must be stronger than the biasing magnetic field of the free magnetic layer, such that the magnetic field of the free magnetic layer will rotate. Where data bits are made smaller to increase the areal data storage density, the magnetic field of such data bits is likewise decreased. It is therefore desirable to fabricate a GMR sensor in which the biasing magnetic field of the free magnetic layer is reduced, such that the sensitivity of the free magnetic layer is increased and the areal data storage density of magnetic bits of hard disk drives can be increased. The magnetic head of the present invention includes a magnetic biasing layer that is directed towards resolving this problem.

SUMMARY OF THE INVENTION

The magnetic head of the present invention includes a GMR sensor having a free magnetic layer and two hard bias layers each adjoining a corresponding end of the free magnetic layer. A bias reduction layer is disposed above and parallel to the free magnetic layer, and a spacer layer is disposed between the free magnetic layer and the bias reduction layer.

The thickness and composition of the spacer layer are selected so as to produce a negative magnetic coupling between the free magnetic layer and the bias reduction layer. The thickness and composition of the bias reduction layer are selected so as to produce a bias reduction magnetic field that creates an oppositely directed magnetic field in the free magnetic layer that partially counteracts the biasing magnetic field of the free magnetic layer. As a result, the sensitivity of the free magnetic layer to smaller data bit magnetic fields from the magnetic disk is significantly increased. This enables the reduction in data track width and increased areal data storage density in hard disk drives that employ a magnetic head according to the invention.

BRIEF DESCRIPTION OF THE DRAWINGS

Objects, features and advantages of the invention will become apparent from the descriptions and discussions herein, when read in conjunction with the drawings. The drawings are generally not drawn to scale such that the relative sizes of the elements shown may be distorted to clarify features of the invention, thus the shapes shown for the elements may vary substantially from their actual shapes.

DETAILED DESCRIPTION OF THE PREFERRED EMBODIMENTS

The descriptions, discussions and figures herein illustrate technologies related to the invention, show examples of the invention, and give examples of using the invention. Known methods, procedures, systems, or elements may be illustrated and described without giving details so as to avoid obscuring the principles of the invention. On the other hand, details of specific embodiments of the invention are presented, even though such details may not apply to other embodiments of the invention.

Figure 1:
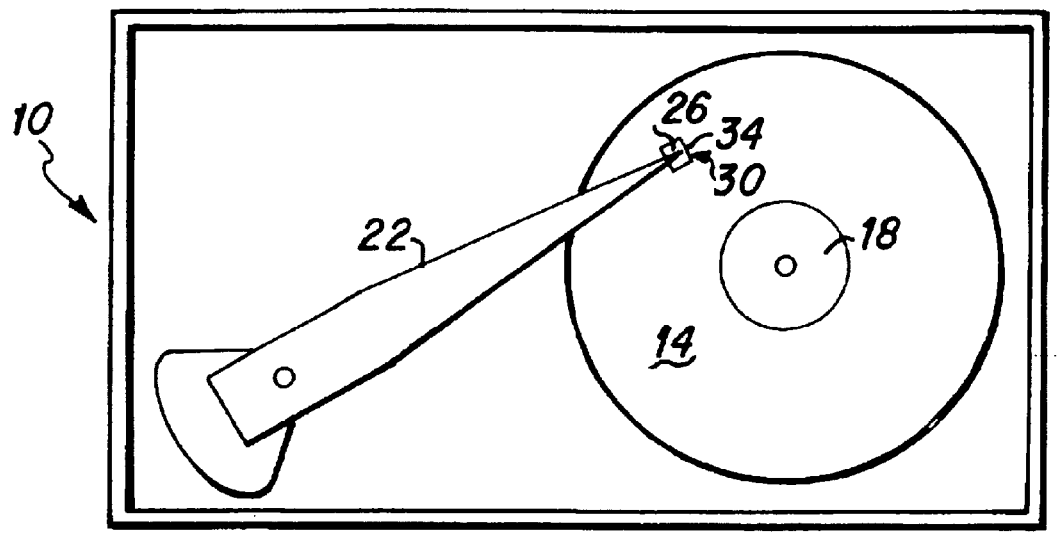
FIG. 1 is a top view of a disk drive that includes a magnetic head according to an embodiment of the invention.

FIG. 1 is a top plan view that depicts significant components of a hard disk drive 10 according to an embodiment of the invention. The hard disk drive 10 includes at least one magnetic media hard disk 14 that is rotatably mounted upon a motorized spindle 18. An actuator arm 22 is pivotally mounted within the hard disk drive 10, and a slider 26 is mounted upon the distal end of the actuator arm 22. The slider 26 has a trailing surfaces, 30 that includes a magnetic head 34 according to an embodiment of the invention. A typical hard disk drive 10 may include a plurality of disks 14 that are rotatably mounted upon the spindle 14 and a corresponding plurality of the actuator arms 22. As is known to those skilled in the art, when the hard disk drive 10 is operated, the hard disk 14 rotates upon the spindle 18 and the slider 26 glides above the surface of the hard disk 14. The surface of the slider 26 that is proximate to hard disk 14 is known as the air bearing surface.

In manufacturing such magnetic heads, a multiplicity of magnetic heads are simultaneously fabricated by coating a series of layers upon the surface of a wafer that is formed from a head substrate material. The wafer is then separated into individual magnetic heads. The surface formed by one of the separations is polished to form the air bearing surface of the magnetic head.

Figure 2:
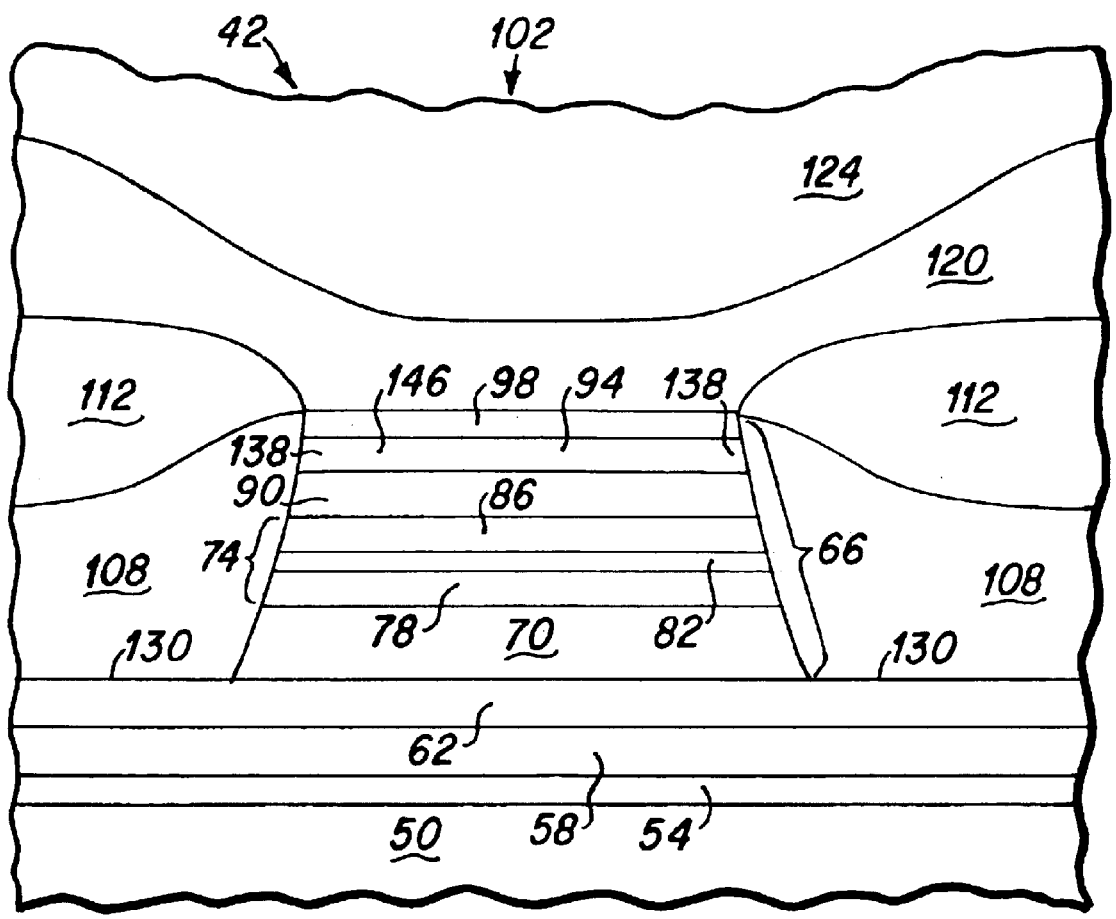
FIG. 2 is an elevational view of the air bearing surface of a read head of a prior art magnetic head.

FIG. 2 is an elevation view of the air bearing surface of a read head 42 of a prior art magnetic head (not shown). The read head 42 includes a head substrate 50, an undercoat insulation layer 54 that is deposited upon the surface of the substrate 50, a first magnetic shield (S1) layer 58 that is deposited upon the undercoat layer 54, and a first gap (G1) layer 62 that is deposited upon the S1 layer 58. The read head 42 further includes a plurality of sensor layers 66 including: an anti-ferromagnetic layer 70; a pinned magnetic structure 74, which may include a first pinned magnetic layer 78; an anti-parallel coupling layer 82; and a second pinned magnetic layer 86. Thereafter, a spacer layer 90, a free magnetic layer 94, and a cap layer 98 are deposited.

The anti-ferromagnetic layer 70 is formed by depositing a material such as platinum manganese (PtMn) upon the first gap layer 62. The first pinned layer 78 is formed by depositing a ferromagnetic material upon the anti-ferromagnetic layer 70. The anti-parallel coupling layer 82 is formed by depositing a metal that is preferably but not necessarily a layer of ruthenium (Ru) that is approximately 8 angstroms (Å) thick upon the first pinned layer 78. The second pinned layer 86 is formed by depositing a ferromagnetic material upon the anti-parallel coupling layer 82. Typically but not necessarily, the first and second pinned layers 78 and 86 have the same thickness (approximately 18 Å for example), and are composed of cobalt iron (CoFe). The spacer layer 90 is formed by depositing a nonmagnetic metal, typically but not necessarily copper (Cu), upon the second pinned layer 86. The free magnetic layer 94 is formed by depositing a ferromagnetic material upon the spacer layer 90; cobalt iron (CoFe) or nickel iron (NiFe) are typically used. The cap layer 98 is formed by depositing a material including, but not limited to, tantalum (Ta) upon the free layer 94.

The fabrication of the read head 42 next includes the masking of a central portion 102 of the sensor layers 66 and subjecting the wafer to an ion beam etching step which removes unmasked sensor layer material down to the first gap layer 62, such that the central portion 102 of the sensor layers 66 remain.

The read head 42 further includes two hard bias layers 108, two thin electrical lead layers 98, a second gap (G2) layer 120, and a second shield (S1) layer 124 that are next fabricated. The two hard bias layers 108 are formed by depositing a ferromagnetic material with high coercivity on top of the wafer and particularly upon the first gap layer 62 in side regions 130 where the layer has been exposed by the patterned etching process. Each hard bias layer 108 is located adjacent to one of the two edge regions 138 of the free magnetic layer 94, which is disposed between the two hard bias layers 108. Each hard bias layer 108 is preferably, but not necessarily comprised of a high coercivity material such as a cobalt platinum chromium (CoPtCr).

Subsequently, following the fabrication of the hard bias layers 108, the thin electrical lead layers 112 are formed by depositing a metal such as rhodium or tantalum on top of the hard bias layers 108. The etching mask is subsequently removed and the second gap (G2) layer 120 is formed by depositing an insulation material across the wafer, and the second magnetic shield (S2) layer 124 is then fabricated by depositing a ferromagnetic material on top of the second gap layer 120.

In addition to the read-head 42, the prior art magnetic head typically includes a further insulation layer (not shown) that is deposited upon the S2 shield 124 and that serves to insulate and separate the read-head from a subsequently fabricated write-head (not shown) of the prior art magnetic head. These elements are well known in the art. The insulation layer between the read head and the write head may be omitted in magnetic heads (termed merged heads) where a single layer functions both as the second shield layer 124 and as a magnetic pole element within the write head that is subsequently fabricated.

As is well understood by those skilled in the art, due to the influence of the bias magnetic field from the hard bias layers 108, the magnetic field within the free magnetic layer 94 is stable and oriented in a single direction parallel to the ABS. When the hard disk drive 10 is operated, the magnetic fields of the data bits that are recorded onto the magnetic disk 14 are strong enough to rotate the magnetic field in the central region 146 of the free magnetic layer 94. This rotation changes the electrical resistance between the thin lead layers 112, and this change in resistance is detected as a data bit signal.

The invention seeks to reduce the cumulative magnetic field that is present in the central region 146 of the free magnetic layer 94, while not substantially changing the cumulative magnetic field that is present in the edge regions 138 of the free magnetic layer 94 that adjoin the hard bias layers 108. Under these conditions, the sensitivity of the free magnetic layer 94 to small magnetic fields from the data bits recorded on the magnetic disk 14 is significantly increased. This will allow the creation of magnetic disks having data bits with reduced area and decreased track width, which will lead to increased areal data storage density in hard disk drives that employ a magnetic head according to the invention. Detailed features of the invention are next described with the aid of FIGS. 3 and 4.

Figure 3:
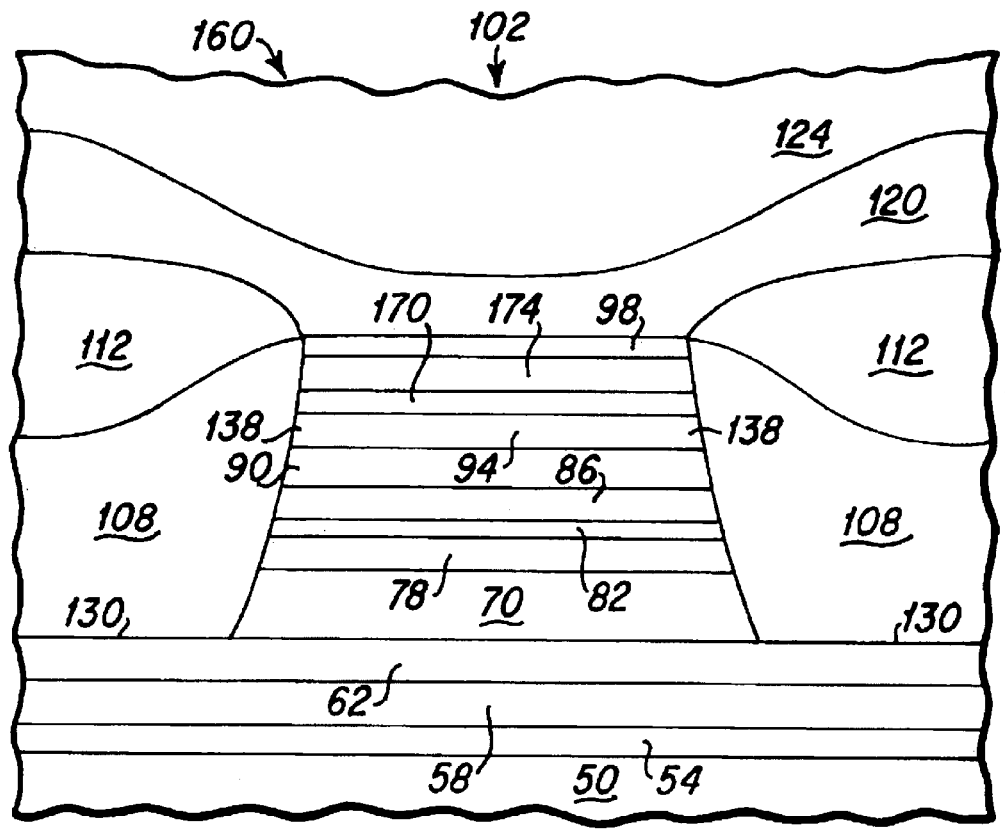
FIG. 3 is an elevational view of the air bearing surface of a read head according to an embodiment of the invention.

FIG. 3 is an elevation view of the air bearing surface of a read head 160 of the magnetic head 34 according to an embodiment of the invention. Except as described below, the layers and elements of the read head 160 are equivalent in fabrication, form, function, and alternatives to the correspondingly numbered layers and elements of the prior art read head 42 shown in FIG. 2.

Comparing the prior art read head 42 and the inventive read head 160, two layers are in the read head 160 that are not present in the prior art, specifically, a bias spacer layer 170 and a bias reduction layer 174. The bias spacer layer 170 is fabricated by depositing a nonmagnetic material upon the free magnetic layer 94, and the bias reduction layer 174 is formed by depositing a ferromagnetic material upon the bias spacer layer 170. The cap layer 98 is then fabricated on top of the bias reduction layer 174, and the hard bias layers 108 and further read head elements are subsequently fabricated using the process that has been described above with regard to the prior art read head 42.

In a preferred embodiment, the bias spacer layer 170 is preferably, but not necessarily, formed of either ruthenium (Ru) or copper (Cu). If ruthenium is used, then the bias spacer layer 114 may have a thickness within the range from 8 Å to 40 Å, and preferably within the range from approximately 15 Å to approximately 20 Å. If copper is used, then the bias spacer layer 114 may have a thickness within the range from 2 Å to 10 Å, and preferably within the range from approximately 5 Å to approximately 6 Å.

The bias reduction layer 174 is preferably formed with a thickness within the range from 5 Å to 20 Å, and preferably approximately 10 Å. The bias reduction layer 174 is preferably, but not necessarily, formed from either nickel iron (NiFe) or a cobalt nickel niobium (CoNiNb). If a nickel iron material is used, then it may be approximately 90% nickel and approximately 10% iron; that is, it may be comprised of between 80% and 95% nickel and between 5% and 20%. If a cobalt nickel niobium material is used, then it may be comprised of between 60% and 85% cobalt, between 20% and 5% nickel, and between 25% and 5% niobium, and preferably approximately 75% cobalt, approximately 10% nickel, and approximately 15% niobium.

Figure 4:
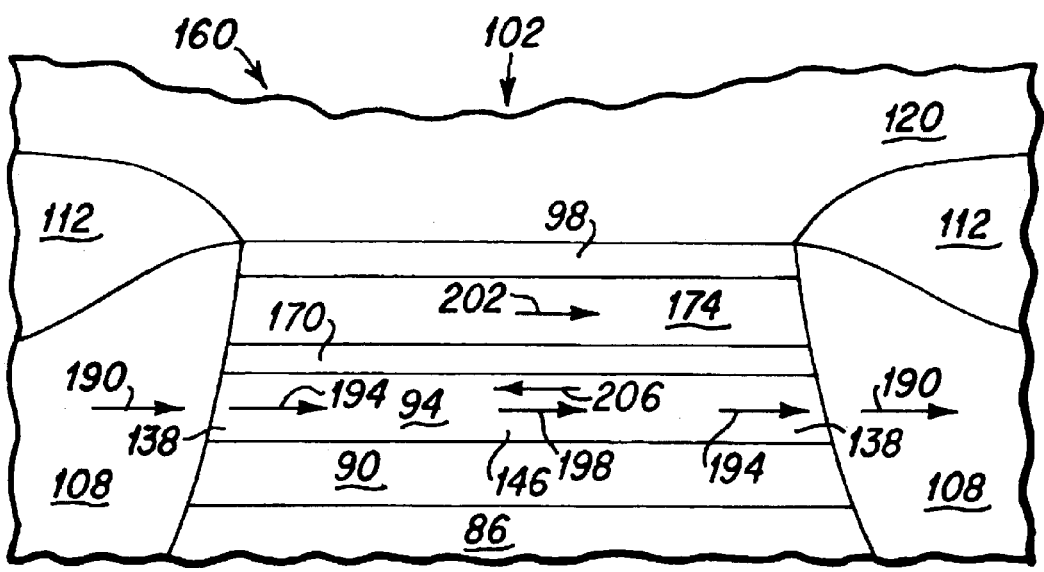
FIG. 4 is an enlarged view of a portion of the read head as shown in FIG. 3, in which arrows indicate the orientation and relative strength of several magnetic fields.

FIG. 4 is an enlarged view of part of the free magnetic layer and bias reduction layer of the read head 160 that is shown in FIG. 3. The arrows in FIG. 4 illustrate the orientation of several magnetic fields that are present within the read head 160. The hard bias layers 108 are each magnetized to generate a magnetic field 190 that is parallel to the air bearing surface of the magnetic head. The magnetic field 190 induces a relatively strong edge bias magnetic field 194 in the edge regions 138 of the free magnetic layer 94, and also induces a relatively weak central bias magnetic field 198 in the central region 146 of the free magnetic layer 94. The bias reduction layer 174 is formed with a permanent bias reduction magnetic field 202, which is oriented in the same direction as the bias magnetic field 190. Significantly, due to the spacer thickness and other parameters, the bias reduction magnetic field 202 is negatively coupled through the spacer layer 170 to the free magnetic layer 94. As a result of the negative coupling, a coupled magnetic field 206 is induced within the free magnetic layer 94 that is antiparallel to the edge bias magnetic fields 194 and to the central bias magnetic field 198. In the central portion 146 of the free magnetic layer 94, the coupled magnetic field 206 substantially counterbalances the bias magnetic field 198. This counterbalancing reduces the cumulative magnetic bias field in the central portion 146 of the free magnetic layer 94, which is thereby rendered more sensitive to the magnetic fields from the data bits recorded on the hard disk 14. Thus, a relatively weak magnetic field from a data bit that occupies relatively little area will overcome the cumulative magnetic bias field within the free magnetic layer 94 and will rotate the magnetic field of the layer. Additionally, the relatively strong edge bias magnetic fields 194 will retain their biasing effects at the edge portions 138 of the free magnetic layer 94 because they are not substantially counterbalanced by the relatively weak coupled magnetic field 206.

As will be understood by one skilled in the art, the material used to form the bias spacer layer 170 and the thickness of this layer may be selected in conjunction with each other, and in conjunction with the other design parameters of the read head 160, so as to produce the negative magnetic coupling between the free magnetic layer 94 and the bias reduction layer 174. As will also be understood by one skilled in the art, the material used to form the bias reduction layer 174 and the thickness of the bias reduction layer 174 may be selected in conjunction with each other, and in conjunction with the design choices made for the other layers and elements with the read head 160, so as to produce a bias reduction magnetic field 206 that substantially counteracts the central bias magnetic field 198, but does not substantially counteract the edge bias magnetic field 194. As will also be understood by one skilled in the art, the hard bias layers 108 may be fabricated such that they induce an edge bias magnetic field 194 of sufficient strength to stabilize the free magnetic layer 94 even when partially counteracted by the bias reduction field 206 from the bias reduction layer 174.

The scope of the invention is set forth by the following claims and their legal equivalents. The invention is subject to numerous modifications, variations, selections among alternatives, changes in form, and improvements, in light of the teachings herein, the techniques known to those skilled in the art, and advances in the art yet to be made. The figures and descriptions herein are intended to illustrate the invention by presenting specific details; they are not intended to be exhaustive or to limit the invention to the designs, forms and embodiments disclosed.

I claim:

1. A magnetic head comprising:

a free magnetic layer having two ends;

two hard bias layers, each adjoining a corresponding end of the free magnetic layer, and which create a bias magnetic field within the free magnetic layer;

a bias reduction layer disposed parallel to the free magnetic layer; and a bias spacer layer disposed parallel to and between the free magnetic layer and the bias reduction layer, wherein the bias spacer layer is comprised of ruthenium or copper;

wherein the bias reduction layer creates a magnetic field within the free magnetic layer that is directed oppositely to the bias magnetic field.

2. A magnetic head according to claim 1, wherein the bias spacer layer is comprised of ruthenium having a thickness between approximately 8 and 40 angstroms (Å).

3. A magnetic head according to claim 1, wherein the bias spacer layer is comprised of copper having a thickness between approximately 2 and 10 Å.

4. A magnetic head according to claim 1, wherein:

the bias spacer layer includes a bias spacer material and has a bias spacer thickness; and the bias spacer material and the bias spacer thickness are selected so as to produce a negative magnetic coupling between the free magnetic layer and the bias reduction layer.

5. A magnetic head according to claim 1, wherein the bias reduction layer is comprised of NiFe or CoNiNb.

6. A magnetic head according to claim 5 wherein the bias reduction layer is approximately 10 Å thick.

7. A magnetic head according to claim 1, wherein the bias reduction layer is comprised of NiFe having approximately 80 to 95% nickel.

8. A magnetic head according to claim 1, wherein the bias reduction layer is comprised of CoNiNb having between 60 to 85% Co, and between 20 to 5% Ni, and between 25 to 5% Nb.

9. A magnetic head according to claim 1, wherein:

the bias reduction layer includes a bias reduction material and has a bias reduction layer thickness; and the bias reduction material and the bias reduction layer thickness are selected so as to produce a bias reduction magnetic field within the free magnetic layer, wherein the bias reduction magnetic field counteracts the bias magnetic field at positions within the free magnetic layer that are between ends of the free magnetic layer.

10. A magnetic head portion according to claim 1, wherein the hard bias layers induce an edge bias magnetic field within the free magnetic layer at the ends of the free magnetic layer, where the edge bias magnetic field is of sufficient strength to stabilize the free magnetic layer even when partially counteracted by a bias reduction magnetic field created by coupling of the free magnetic layer with the bias reduction layer.

11. A hard disk drive for reading and writing information in a magnetic medium, the disk drive comprising:

a disk having a surface that includes the magnetic medium;

a motor coupled to rotate the disk;

a slider having an air bearing surface;

an actuator configured to hold the air bearing surface of the slider proximate to the surface of the disk;

a magnetic head disposed within the slider and forming part of the air bearing surface, wherein the magnetic head includes:

i) a free magnetic layer having two ends;

ii) two hard bias layers, each adjoining a corresponding end of the free magnetic layer, and which create a bias magnetic field within the free magnetic layer;

iii) a bias reduction layer disposed parallel to the free magnetic layer;

iv) a bias spacer layer disposed parallel to and between the free magnetic layer and the bias reduction layer, wherein the bias spacer layer is comprised of ruthenium or copper; and wherein the bias reduction layer creates a magnetic field within the free magnetic layer that is directed oppositely to the bias magnetic field.

12. A hard disk drive according to claim 11, wherein the bias spacer layer is comprised of ruthenium having a thickness between approximately 8 and 40 Å.

13. A hard disk drive according to claim 11, wherein the bias spacer layer is comprised of copper having a thickness between approximately 2 and 10 Å.

14. A hard disk drive according to claim 11, wherein:

the bias spacer layer includes a bias spacer material and has a bias spacer thickness; and the bias spacer material and the bias spacer thickness are selected so as to produce a negative magnetic coupling between the free magnetic layer and the bias reduction layer.

15. A hard disk drive according to claim 11, wherein the bias reduction layer is comprised of NiFe or CoNiNb.

16. A hard disk drive according to claim 11, wherein the bias reduction layer is comprised of NiFe having approximately 80 to 95% nickel.

17. A hard disk drive according to claim 11, wherein the bias reduction layer is comprised of CoNiNb having between 60 to 85% Co, and between 20 to 5% Ni, and between 25 to 5% Nb.

18. A hard disk drive according to claim 11, wherein the bias reduction layer is approximately 10 Å thick.

19. A hard disk drive according to claim 11, wherein:

the bias reduction layer includes a bias reduction material and has a bias reduction layer thickness; and the bias reduction material and the bias reduction layer thickness are selected so as to produce a bias reduction magnetic field within the free magnetic layer, wherein the bias reduction magnetic field counteracts the bias magnetic field at positions within the free magnetic layer that are between ends of the free magnetic layer.

20. A hard disk drive according to claim 11, wherein the hard bias layers induce an edge bias magnetic field within the free magnetic layer at the ends of the free magnetic layer, where the edge bias magnetic field is of sufficient strength to stabilize the free magnetic layer even when partially counteracted by a bias reduction magnetic field created by coupling of the free magnetic layer with the bias reduction layer.

* * * * *